United States Patent
Karels et al.

(10) Patent No.: US 9,491,377 B2
(45) Date of Patent: Nov. 8, 2016

(54) METHODS OF EXTRACTING 4-BAND DATA FROM A SINGLE CCD; METHODS OF GENERATING 4×4 OR 3×3 COLOR CORRECTION MATRICES USING A SINGLE CCD

(71) Applicant: Trimble Navigation Limited, Sunnyvale, CA (US)

(72) Inventors: Steven N. Karels, Salem, NH (US); Joseph S. Kosofsky, Scarborough (CA); Omer Mian, Goodwood (CA); Ronald S. Warren, Chelmsford, MA (US)

(73) Assignee: Trimble Navigation Limited, Sunnyvale, CA (US)

( * ) Notice: Subject to any disclaimer, the term of this patent is extended or adjusted under 35 U.S.C. 154(b) by 289 days.

(21) Appl. No.: 13/961,311

(22) Filed: Aug. 7, 2013

(65) Prior Publication Data
US 2015/0042816 A1   Feb. 12, 2015

(51) Int. Cl.
| H04N 9/04 | (2006.01) |
| H04N 5/33 | (2006.01) |
| H04N 5/232 | (2006.01) |
| G03B 11/00 | (2006.01) |

(52) U.S. Cl.
CPC ............ *H04N 5/332* (2013.01); *G03B 11/00* (2013.01); *H04N 5/23229* (2013.01); *H04N 9/045* (2013.01)

(58) Field of Classification Search
CPC .............................. H04N 9/045; H04N 5/33
USPC ........................................................ 348/164
See application file for complete search history.

(56) References Cited

U.S. PATENT DOCUMENTS

| 3,971,065 | A |   | 7/1976 | Bayer |
| 5,661,817 | A | * | 8/1997 | Hatlestad ............ G06K 9/00657 348/144 |
| 2007/0024879 | A1 |   | 2/2007 | Hamilton, Jr. |
| 2007/0024931 | A1 |   | 2/2007 | Compton |
| 2009/0147098 | A1 | * | 6/2009 | Li ......................... H04N 1/6077 348/223.1 |
| 2010/0066857 | A1 | * | 3/2010 | Ovsiannikov .......... H04N 9/735 348/223.1 |
| 2010/0283866 | A1 | * | 11/2010 | Numata ................. H04N 5/332 348/223.1 |
| 2011/0134288 | A1 | * | 6/2011 | Kasai ..................... H04N 9/045 348/241 |

(Continued)

FOREIGN PATENT DOCUMENTS

DE   EP 1335216 A2 *  8/2003  ............. G02B 5/282

OTHER PUBLICATIONS

"Pro IRND 0.6 2-Stops Light Loss." Kenko Tokina USA, Inc. N.p., n.d. Web. Jun. 28, 2016.*

*Primary Examiner* — Justin P Misleh
(74) *Attorney, Agent, or Firm* — Kilpatrick Townsend & Stockton LLP

(57) ABSTRACT

Cameras for capturing an image of an object include a CCD, an optical filter for removing energy of a portion of the spectrum wavelengths, and a ND filter for variable light attenuation. Methods for generating 4-band image data involve obtaining four spectral channels of data using a single CCD and generating 4-band image data. Methods for generating a 4×4 (or a 3×3) color correction matrix involve obtaining four (or three) spectral channels of data with a single CCD and generating the 4×4 (or 3×3) color correction matrix based on these four (or three) spectral channels of data.

31 Claims, 15 Drawing Sheets

(56) References Cited

U.S. PATENT DOCUMENTS

| | | | |
|---|---|---|---|
| 2011/0228097 A1* | 9/2011 | Motta | H04N 5/33 348/164 |
| 2012/0123205 A1* | 5/2012 | Nie | A61B 1/00174 600/109 |
| 2012/0200731 A1* | 8/2012 | Park | H04N 9/045 348/223.1 |
| 2013/0194432 A1* | 8/2013 | Kanto | H04N 5/332 348/164 |
| 2014/0078459 A1* | 3/2014 | Kim et al. | G02F 1/1333 349/193 |
| 2014/0347493 A1* | 11/2014 | Higashitsutsumi | H04N 5/2254 348/164 |

* cited by examiner

| Plate # | Description | Reflectance (%) | | | |
|---|---|---|---|---|---|
| | | Red | Green | Blue | NIR |
| 1 | Dark Skin | 18.91411 | 7.723856 | 6.600056 | 52.63444 |
| 2 | Light Skin | 61.00078 | 28.84394 | 26.22442 | 82.82758 |
| 3 | Blue Sky | 13.54892 | 20.76958 | 29.841 | 22.75864 |
| 4 | Foliage | 11.57003 | 13.20914 | 6.136278 | 14.67011 |
| 5 | Blue Flower | 36.30261 | 25.22934 | 36.79978 | 83.94783 |
| 6 | Bluish Green | 17.66947 | 51.54986 | 45.76051 | 76.14295 |
| 7 | Orange | 61.16642 | 14.68436 | 6.694359 | 71.55783 |
| 8 | Purplish Blue | 12.35074 | 13.51797 | 34.62995 | 73.01897 |
| 9 | Moderate Red | 59.09442 | 9.663451 | 12.15851 | 52.75908 |
| 10 | Purple | 14.93931 | 5.270654 | 10.46223 | 29.80486 |
| 11 | Yellow Green | 31.74325 | 45.8629 | 13.73201 | 59.04378 |
| 12 | Orange Yellow | 64.58672 | 27.90177 | 8.039768 | 61.07981 |
| 13 | Blue | 4.868917 | 7.340141 | 22.97785 | 30.79995 |
| 14 | Green | 8.415575 | 29.1468 | 11.35122 | 61.36802 |
| 15 | Red | 54.57036 | 5.466499 | 5.272444 | 52.25831 |
| 16 | Yellow | 74.12094 | 48.01414 | 10.05141 | 74.2267 |
| 17 | Magenta | 69.20658 | 12.18118 | 24.272 | 73.88743 |
| 18 | Cyan | 7.016511 | 28.89585 | 40.17722 | 37.46559 |
| 19 | White | 89.69589 | 89.56209 | 89.14993 | 86.55924 |
| 20 | Neutral 8 | 55.68925 | 58.09149 | 58.09783 | 45.25429 |
| 21 | Neutral 6.5 | 33.37256 | 36.00768 | 36.11607 | 22.93286 |
| 22 | Neutral 5 | 17.46364 | 18.53547 | 18.7732 | 11.44656 |
| 23 | Neutral 3.5 | 7.611547 | 8.433587 | 8.75099 | 5.228364 |
| 24 | Black | 3.089625 | 3.2537 | 3.414776 | 2.521495 |

| Plate Number | Red | Green | Blue | Panchromatic |
|---|---|---|---|---|
| 1 | 286.2189 | 274.2293 | 240.2558 | 498.7143 |
| 2 | 599.4297 | 547.1339 | 469.1551 | 966.9732 |
| 3 | 252.8806 | 357.1959 | 405.1388 | 725.7551 |
| 4 | 208.5635 | 266.7073 | 202.0714 | 470.9306 |
| 5 | 525.5251 | 574.6178 | 647.5888 | 997.7645 |
| 6 | 531.6786 | 924.9431 | 823.2077 | 1184.27 |
| 7 | 582.6087 | 444.9425 | 289.4334 | 849.467 |
| 8 | 297.087 | 362.8207 | 479.7908 | 715.1168 |
| 9 | 523.1615 | 339.8447 | 299.9764 | 773.123 |
| 10 | 230.2935 | 221.9807 | 248.9505 | 443.6908 |
| 11 | 466.6663 | 664.839 | 395.3925 | 956.2891 |
| 12 | 704.6457 | 654.0338 | 353.6393 | 1031.52 |
| 13 | 189.8855 | 238.3653 | 332.5847 | 494.7355 |
| 14 | 280.4609 | 455.3586 | 326.2016 | 685.5938 |
| 15 | 472.31 | 280.9664 | 243.2643 | 640.2629 |
| 16 | 716.6583 | 770.1792 | 391.7389 | 1092.865 |
| 17 | 581.0912 | 396.6014 | 444.2399 | 883.4622 |
| 18 | 255.4148 | 430.6787 | 503.3065 | 793.3111 |
| 19 | 873.2384 | 1130.829 | 1005.918 | 1388.283 |
| 20 | 593.3828 | 772.4019 | 697.2847 | 1170.714 |
| 21 | 400.6254 | 515.9984 | 467.9357 | 935.7206 |
| 22 | 254.8858 | 317.686 | 290.713 | 643.6728 |
| 23 | 165.7673 | 199.2132 | 187.4655 | 377.2898 |
| 24 | 122.6327 | 141.7767 | 139.4074 | 242.2016 |

Fig. 10

| Tarp Shade | Reflectance (%) |
|---|---|
| White | 60 |
| Light Gray | 33 |
| Dark Gray | 15 |
| Black | 4 |

Fig. 11

METHODS OF EXTRACTING 4-BAND DATA FROM A SINGLE CCD; METHODS OF GENERATING 4×4 OR 3×3 COLOR CORRECTION MATRICES USING A SINGLE CCD

FIELD OF THE INVENTION

The present invention relates in general to cameras capable of capturing 4-band imagery and methods for the use of such cameras.

BACKGROUND OF THE INVENTION

Most cameras on the market generate 3-band image data, generally composed of the red, green and blue ("RGB") bands. It is known for a camera to generate 3-band image data through the use of a single charge-coupled device ("CCD"). A CCD is a device which converts photons of light, such as those which are received through the lens of a camera, into electrical signals. CCDs used in cameras generally have a two dimensional ("2D") array of pixels, with each pixel generating its own electrical signal corresponding to the incident light energy.

It is also known for multiple specialized cameras to generate 4-band image data. Such 4-band image data may be composed of RGB and near infra-red ("NIR") bands. However, the multiple specialized cameras generating 4-band data have used more than one CCD in the process, such as in two separate cameras. For example, two cameras have been used, each with one CCD, along with a lens system and an appropriate optical filter. One camera may be configured as an RGB camera with a visible optical filter, while the second camera may be identical to the first camera except using an optical NIR filter in place of the visible optical filter. This allows NIR light to expose the CCD of the second camera while blocking the visible light. Both cameras record the imagery onto a recording device during in-flight operation. During post-flight processing, the two images (RGB and NIR) are combined to produce a 4-band image. Registration errors due to slight mis-alignments between the two cameras (and their respective CCDs) are inherently present for the two camera system. In addition, the use of multiple cameras and CCDs adds to the cost and complexity of the 4-band system.

There are many CCDs available on the market, including the Truesense Class 1 KAI-29050 CCD, manufactured by Truesense Imaging, Inc. (formerly Kodak). CCDs are described, for example, in U.S. Patent Publication No. US 2007/0024931 of Compton et al. The KAI-29050 CCD has pixels which are sensitive to panchromatic ("pan"), red, green and blue light, and is contained within industrial cameras such as those made by Imperx or Illunis, but such a single CCD has only been used to generate 3-band image data. It has not been known how to use only a single such CCD in the generation of 4-band data.

Certain filters are also known to be useful in connection with cameras, including a variety of off-the-shelf neutral density ("ND") filters. ND filters equally attenuate wavelengths of light, at least within the visible spectrum, but, particularly with inexpensive ND filters, the amount of attenuation outside the visible spectrum can be different. For example, the Tiffen ND0.6 filter attenuates significantly less NIR light than visible light. But, again, it has not been known how to employ such filters to generate 4-band data using a single CCD.

Moreover, color calibration technology is known in connection with cameras. Such color calibration may make use of color calibration targets 90, such as a Macbeth® ColorChecker2 target (shown in FIG. 5). One use of this target has been for 3×3 (visible) calibration.

Most cameras use a CCD that employs the Kodak Bayer pattern (shown in FIG. 7). Some others use the TrueSense CFA pattern. The Kodak Bayer filter pattern employs three colors, arranged in a mosaic on a square grid of photosensors; the filters being 50% green, 25% red, and 25% blue. Various de-mosaicing software programs have been used to process imagery collected using the Bayer pattern to interpolate 3-band data, specifically: red, green and blue values for each pixel. Additional information about this pattern is available in Dr. Bayer's (of Kodak) U.S. Pat. No. 3,971,065.

TrueSense Imaging, Inc. introduced the TrueSense CFA pattern to improve color imaging at lower light levels because panchromatic masked pixels are more sensitive to incident light. The TrueSense CFA pattern (shown in FIG. 7) employs four colors, arranged in a mosaic on a square grid of photosensors; the filters being 50% panchromatic, 25% green, 12.5% red and 12.5% blue. Software has been created to de-mosaic images, such as that created by TrueSense Imaging, Inc. Such de-mosaicing software is described in U.S. Patent Publication Number 2007/0024879 A1 of Hamilton et al. However, it has not been known how to use such targets 90, patterns 80 and de-mosaicing software in the generation of 4-band data using a single CCD.

Accordingly, there exists a need for new and improved cameras, and methods of use for such cameras, that are capable of generating 4-band data using only a single CCD. In particular, there exists a need for such cameras 60 and methods that take advantage of targets 90, patterns 80, specialized filters (20;40), and custom de-mosaicing software to generate high-quality, radiometrically accurate 4-band image data. Such data is of particular use in the field of airborne photogrammetry, where visible spectrum data (such as RGB data) as well as NIR data is exploited. Cameras and methods useful for generating radiometrically accurate 4-band image data are also of particular value in the Geographical Information System ("GIS") community. For example, RGB imagery can be used for visualization purposes and in addition, the NIR data coupled with the RGB data can be used in agricultural and forestry applications to obtain useful information on vegetation classification, health and stress.

SUMMARY OF THE INVENTION

The present invention provides for devices and methods that allow for extraction of 4-band (including RGB and NIR) imagery (including without limitation imagery pertaining to an object, such as a single item or a scene taking up an entire field of view) from a single CCD 10 (shown in FIG. 13), such as a TrueSense CFA CCD. For example, in one embodiment, a TrueSense Class 1 KAI-29050 CCD may be used. In certain embodiments, only RGB imagery can be produced while in other embodiments, all 4-band data can be processed through the software to de-mosaic the image into pan, red, green and blue data. In both embodiments (i.e., RGB and 4-band data) a special optical filter 20 is employed.

In some embodiments, calibration of cameras 60 (shown in FIG. 14) occurs using a color target 90 (shown in FIG. 5), such as the Macbeth® ColorChecker2 target. The camera measurements from a number of color plates 92 on such a color target 90 may be collected and averaged. In certain embodiments, color correction data, such as a color correction matrix (which may be referred to as an "M Matrix") may be derived using approaches such as linear regression using least squares techniques. Such M Matrices may be in the form of a 3×3 matrix for RGB or a 4×4 matrix for 4-band data. In certain embodiments, post-mission linear correction may be applied to the de-mosaiced images, thereby improving band linearity.

In certain embodiments, custom software and a combination of optical filters (20; 40) (shown in FIG. 13) are used to obtain radiometrically accurate 4-band imagery from a single CCD 10 (such as a TrueSense CFA progressive scan CCD, including the KAI-29050 CCD). The CCD 10, in some embodiments, may have pan, red, green, and blue light sensitive pixels. In some embodiments, the CCD 10 is contained within the camera 60, such as an industrial camera, including those made by Imperx or Illunis or other camera manufacturers well-known in the art.

In a preferred embodiment, an ND filter 40, such as the Tiffen ND0.6 filter, is added which attenuates visible wavelengths while allowing NIR wavelengths to pass through with less attenuation (shown in FIG. 4). This embodiment is particularly useful with respect to the camera 60 recording 4-band imagery. Alternately, the camera 60 can record RGB imagery, preferably with the use of a standard VIS filter (e.g. a B+W486 filter) that is substituted for the ND filter. Accordingly, the two kinds of filters (i.e., ND0.6 and B+W486 filter) can be readily swapped depending on whether RGB or 4-band data is desired. In some embodiments, the protective glass over the CCD 10 is removed and a special optical filter 20 is employed. In a preferred embodiment, such a special optical filter 20 removes a wavelength region between red and NIR.

In preferred embodiments, a mechanical shutter 30 is added to reduce or eliminate CCD read-off smear; smear is characteristic of a progressive scan CCD being operated at very short exposure times with relatively long read-off times.

BRIEF DESCRIPTION OF THE DRAWINGS

Further features and advantages of the invention may be understood by reviewing the following detailed description of the preferred embodiments of the invention taken together with the attached drawings, in which:

FIG. 6 is a chart describing the colors and reflectances of the Macbeth® ColorChecker2 Target 90.

FIG. 10 is a chart showing computed averaged values within the averaging boxes of FIG. 9, according to an embodiment of the present invention.

FIG. 11 is a chart showing shades and published reflectance values of four commercially available radiometric tarps.

DETAILED DESCRIPTION OF THE DRAWINGS AND PREFERRED EMBODIMENTS

Figure 1:
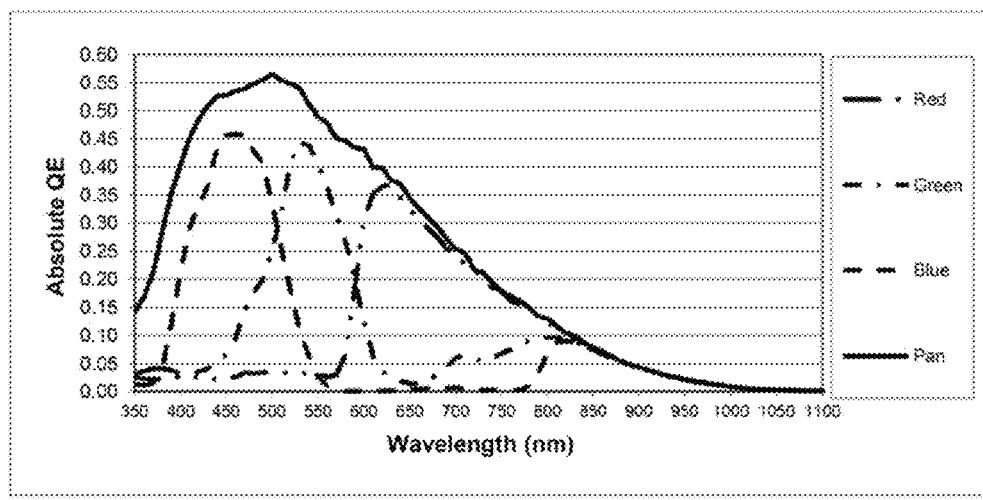
FIG. 1 is a chart showing the theoretical Quantum Efficiency (QE) of a prior art TrueSense CFA CCD.
Figure 2:
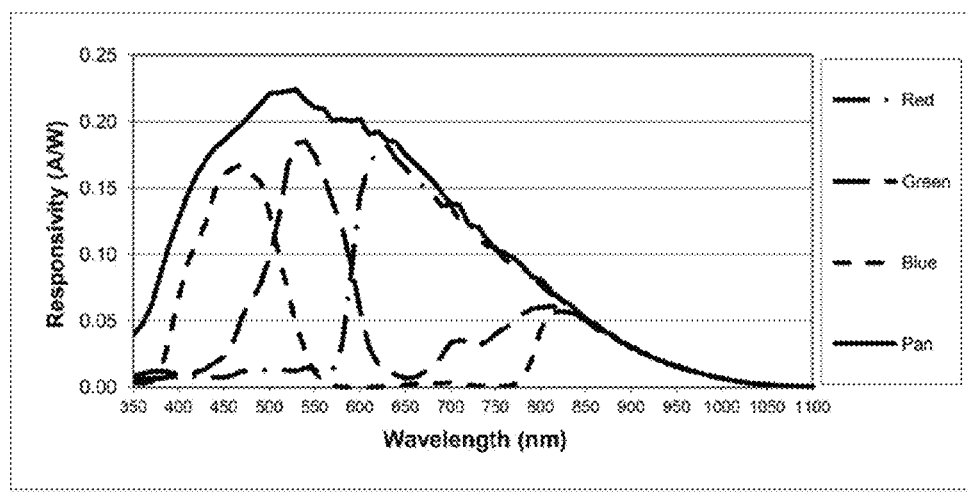
FIG. 2 is a chart showing the responsivity of a prior art TrueSense CFA CCD.

FIG. 1 shows the theoretical quantum efficiency ("QE") for a Truesense CFA CCD as offered by Truesense Imaging, Inc., as a function of light wavelength in nanometers. Four separate bands (also referred to as "channels") are shown: red, green, blue and panchromatic ("pan"). The pan channel has a higher QE at all wavelengths than each of the other three channels. FIG. 2 shows the data of claim 1 converted to responsivity, measured in amperes per watt ("A/W"), also as a function of light wavelength in nanometers.

According to an embodiment of the present invention, the four spectral channels of data obtained through the use of a CCD 10, including but not limited to a Truesense CFA CCD such as the KAI-29050 progressive scan CCD, are used to extract four output bands through a linear process.

Figure 3:
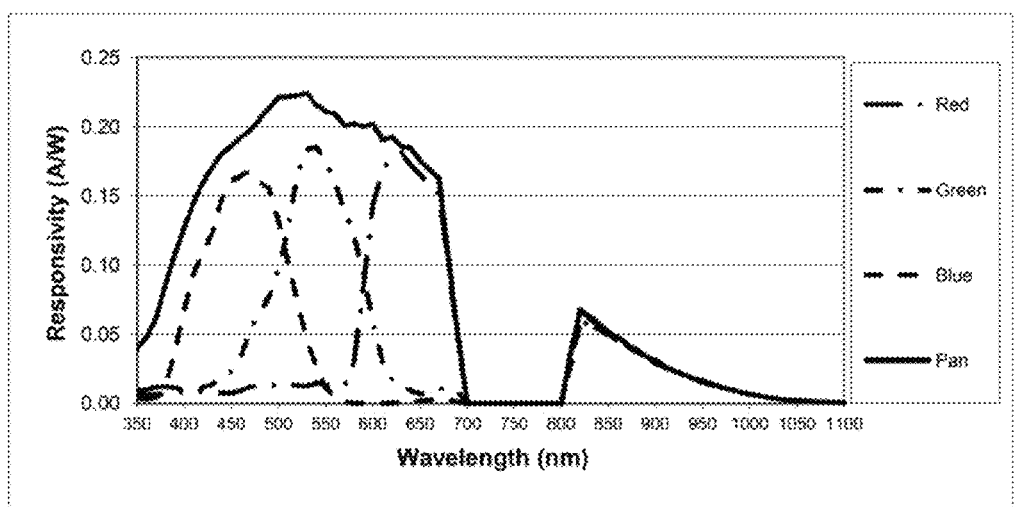
FIG. 3 is a chart showing the responsivity of the prior art TrueSense CFA CCD, which has been modified with a special optical filter 20 according to an embodiment of the present invention.

According to a preferred embodiment of the present invention, in this process the uncorrelated spectral region between wavelengths of about 660 nm and about 800 nm is filtered out. Preferably, this is done through optical filtering. In conventional Color InfraRed (CIR) image collection, a blue cutoff filter is used to filter out this region such that green, red and NIR energy is received on the red, green and blue pixels. According to an embodiment of the present invention, an optical filter 20 is used which removes wavelengths between approximately 650 nm and 800 nm, or between approximately 700 nm and 800 nm. By "removes" it will be understood that not every last photon of light in these wavelength regions need be eliminated. Rather, it will be understood that a reduction on the order of 99.9% or greater constitutes such removal. The optical filter 20 may be 52 mm in diameter and placed immediately over the CCD 10 (including its cover glass 85). Its thickness should be chosen to maintain proper focus between the CCD 10 surface and the lens. FIG. 3 shows the responsivity of the prior art Truesense CFA CCD, which has been modified with a special optical filter 20 according to an embodiment of the present invention.

Figure 4:
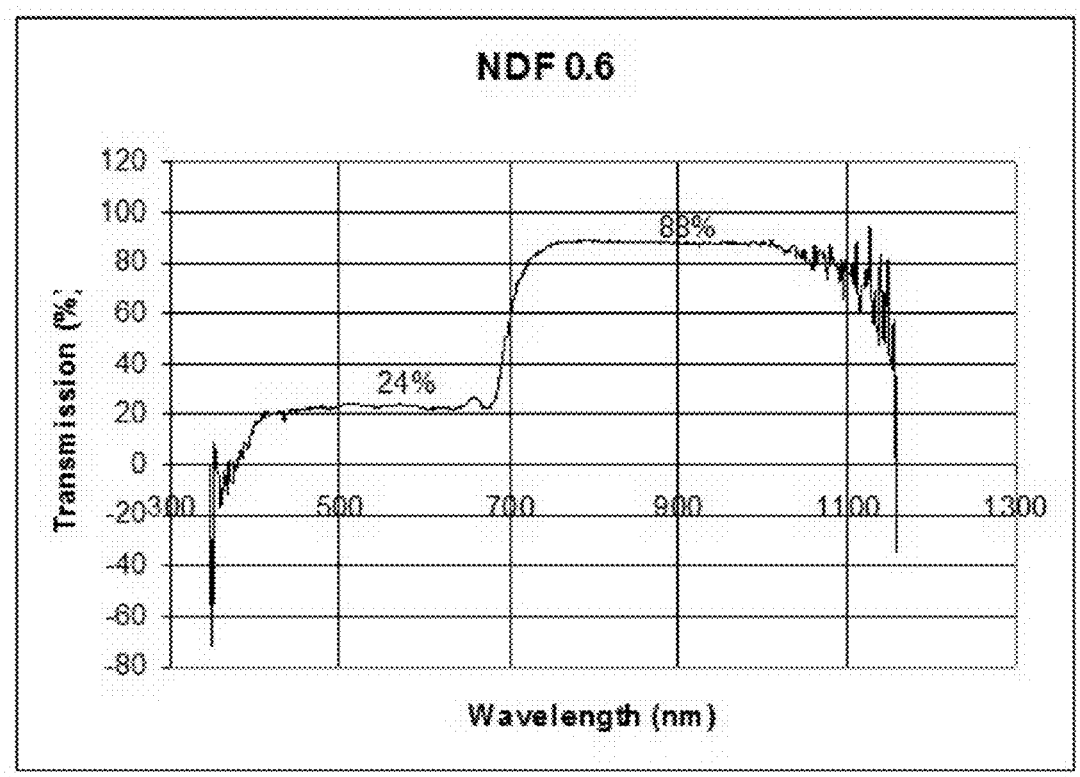
FIG. 4 is a chart showing the light transmission allowed by a particular prior art ND filter.

According to a further embodiment of the present invention, in addition to the special optical filter 20, an ND filter 40 is used. Typically, a 57 mm diameter is employed for the ND filter 40, but the diameter used can depend on factors such as the external lens and its filter diameter attachment size. Preferably, this ND filter 40 attenuates relatively more of the light in the visible region of the spectrum, and relatively less in the NIR region of the spectrum. FIG. 4 shows the light transmission allowed by a particular prior art Tiffen ND0.6 filter. According to one embodiment of the present invention, this filter or a ND filter 40 having similar light transmission properties may be used (in addition to the special optical filter 20 as described above). Preferably, the light transmission of the ND filter 40 is about 24% in the visible region of the spectrum between about 400 nm and about 650 nm, and about 88% in the NIR region of the spectrum between about 800 nm and about 1100 nm. Preferably, the ratio of the transmission between these two regions is between 1:3 and 1:4 or, alternately, between 1:3.5 and 1:4.0. Alternately, the ND filter 40 transmits about 20-30% in the first of these two regions, and about 82-94% in the second of these two regions. The use of such a ND filter 40 has the advantage that the CCD's relatively lower responsivity for the NIR portion of the spectrum between 800 nm to 1100 nm, as shown in FIG. 3, will be appropriately compensated, thereby avoiding noisy NIR images.

In an optional but preferred embodiment, a mechanical shutter 30 is also added to control the amount of light received by the camera 60. This has the advantage of reducing or eliminating read-off smear. Such light smear contamination is common to progressive scan CCDs 10 with short exposure times and high ambient light conditions. Such a mechanical shutter 30 is of particular importance when using a progressive scan CCD 10, which collects image information in each pixel during the electronic exposure time period, and which shifts the image information along the CCD 10 and then outputs it after the exposure time ends. While this shifting occurs, parts of the CCD 10 that are illuminated by high reflective portions of the image can contaminate the collected pixel sample, creating "read-off smear". This is because there is imperfect isolation between the captured pixel data as it is transported to the recording device and the surface illumination of the CCD 10. Advantageously, according to the present invention, the use of a mechanical shutter 30 that is open before and during the CCD 10 exposure time, and then closed afterwards to prevent ambient light from reaching the CCD 10 surface during transportation of the pixel image data effectively eliminates the read-off smear.

Figure 5:
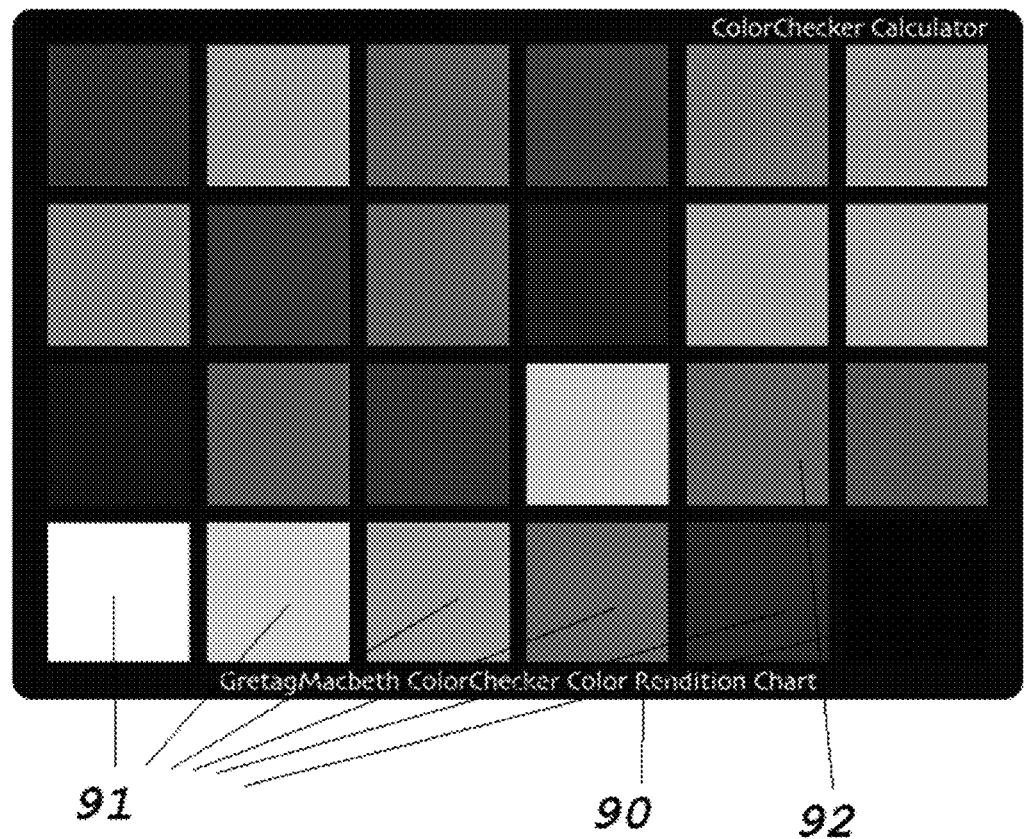
FIG. 5 is an image of the prior art Macbeth® ColorChecker2 Target 90.
Figure 7:
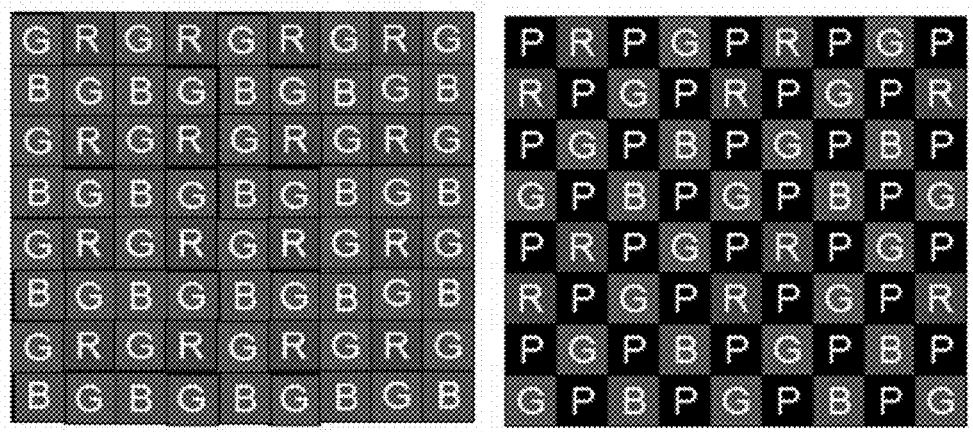
FIG. 7 shows images of the prior art Bayer CCD (Left) and Truesense CFA CCD (Right) mask patterns 80.

In an additional embodiment of the present invention, estimates of red, green, blue and NIR information are extracted. In doing so, a color target 90 may be employed, preferably, a Macbeth® ColorChecker 2 calibration target, as seen in FIG. 5. The plates (91; 92) of the color target 90 are measured, preferably through the use of spectral-radiometer, and the reflectivity at various wavelengths is determined. Preferably, the reflectivity is determined between the wavelengths of 400 nm and 1100 nm. FIG. 6 shows the reflectances of the various plates (91; 92) of a color target 90, specifically, the Macbeth® ColorChecker 2 calibration target 90, as determined through the use of a spectral-radiometer.

In a preferred embodiment of the present invention, camera 60 calibration begins by capturing an image of the color target 90 with the camera 60, preferably in sunlight, and preferably with the camera 60 having the special optical filter 20 and ND filter 40 as described above. Preferably, a mask pattern 80 having mosaiced red, green, blue and pan pixels, such as the TrueSense CFA CCD mask pattern, is employed.

Figure 8:
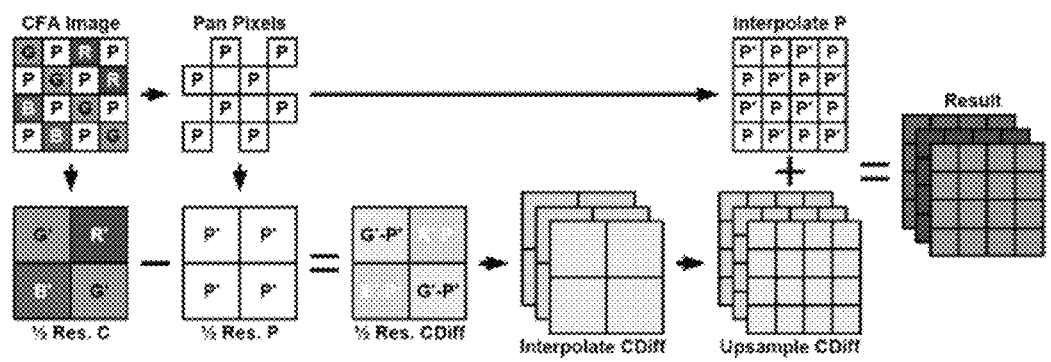
FIG. 8 is an image of a prior art Truesense software processing path.

The raw image, which consists of a mosaiced pattern of pan, red, green and blue pixels (for example, corresponding to the pixels of the TrueSense CFA CCD mask pattern with various intensities), is processed to de-mosaic the image and interpolate each pixel to derive its value in each of the four bands. Preferably, software is used in this process. Prior art software, such as that developed by Kodak, has a flow as shown in FIG. 8. Such software is further described in U.S. Patent Publication Number 2007/0024879 A1 of Hamilton, J R. et al. In such software, the raw image is separated into pan pixels and RGB pixels. Through a series of combining, filtering, and processing, full resolution red, green and blue pixels are reconstructed. As can be seen in FIG. 8 as "result", such software only outputs 3-band data (red, green and blue). According to an embodiment of the present invention, different, non-prior art specially programmed software is used that outputs 4-band data, specifically, red, green, blue and pan. This may be accomplished by modifying the software as described in FIG. 8 and U.S. Patent Publication Number 2007/0024879 A1 of Hamilton, J R. et al. to additionally output pan data, preferably full-resolution pan data. The software may be installed on a specially-programmed computer.

In an embodiment of the present invention, the raw imagery is read and converted to two types of files: (1) Full Resolution ("Full Res"); and (2) 8-Bit RGB files.

Preferably, the Full Res files are 4-band data (red, green, blue and pan) stored as 16 bit integers. Lower resolution data may be stored in such 16 bit integers, such as 12 bit resolution data. Alternately, such 12 bit resolution data may be stored in another format. Preferably, these files are electronically stored as images, such as TIFF formatted images. In a preferred embodiment, each band of data is at the full resolution obtainable through the CCD 10.

Figure 9:
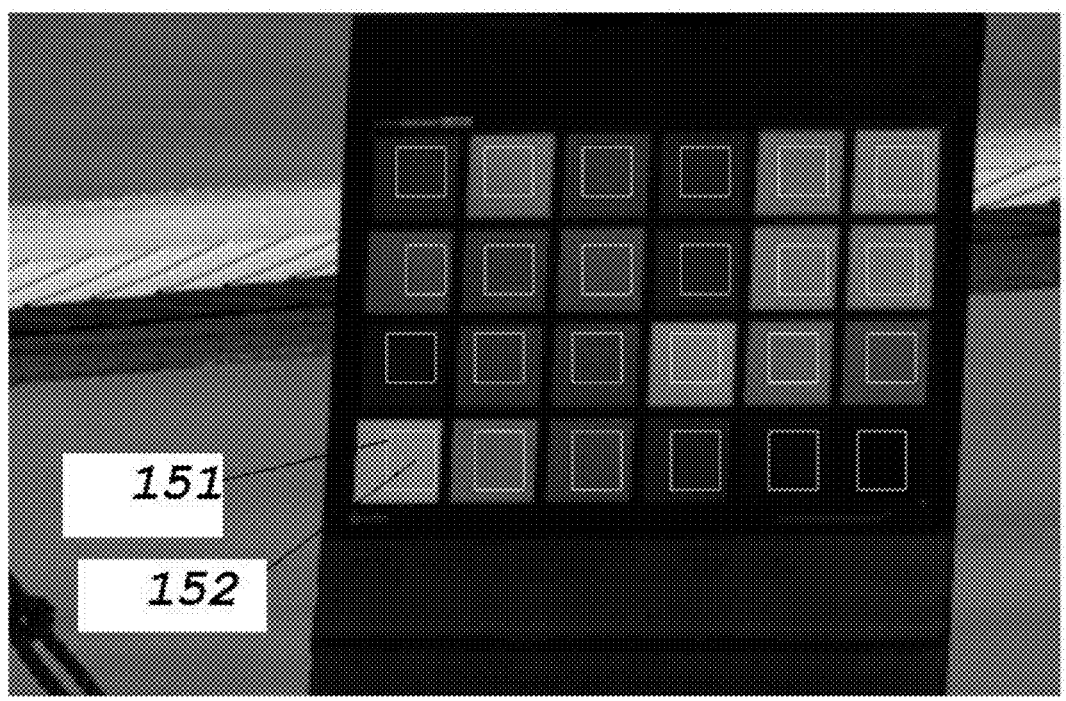
FIG. 9 is an output image showing the locations of averaging boxes with respect to a color calibration target 90 according to an embodiment of the present invention.

The 8-Bit RGB file is a 3-band image. It is preferably used for quality control and to determine the location of the color target plates (91; 92) which are used in the calibration process. The location of each plate (91; 92) of the color target 90 is stored, such as a region 152 defined in a text file. An image, such as that shown in FIG. 9, may be generated, based on the stored location data, and used to verify that the regions 152 are accurately assigned to that of the various plates (91; 92) of the color target 90. In this image, lines 151 are added bounding the various regions 152. Preferably, the regions are each rectangular, and defined by a corner pixel location, a height, and a width, but the regions may be defined in other ways as are known in the art, and other shapes may be used.

The software computes average values for the red, green, blue and pan pixels in the defined region corresponding to each plate (91; 92). FIG. 10 shows sample values generated when this process was performed for an image of a MacBeth® ColorChecker 2 target 90 taken in sunlight.

These computed average values are used in a linear regression (also known as a least squares technique or "linear regression using least squares") performed using a pseudo-inverse matrices methodology. These methodologies are used to create a 4×4 color correction matrix (an "M matrix"). This M Matrix can be applied to each pixel's full resolution values (which include pan, red, green and blue) to generate RGB and NIR estimates for that pixel from the full resolution red, green, blue and pan imagery.

In an optional but preferable embodiment, color (spectral) balancing is accomplished using neutral plates 91 (such as white, grays, and black) in the color target 90. Preferably, red and blue channels are color-balanced, while green and pan channels are unchanged.

After calibration, according to this methodology, the M Matrix may be used for all future images taken where the same optical filters (20; 40), CCD 10 and mechanical shutter 30 that were present during the calibration process are used. Preferably, the images taken are airborne images, or other images similarly characterized by short exposure times and high ambient light conditions. Preferably, any collected aerial imagery is post-collection processed using color balancing techniques.

Preferably, after the M Matrix is applied to the full resolution data, the resulting data is compared against the camera truth information (from the color target 90) and a linear (scale factor and bias) optimal model is generated for each output band to more accurately reproduce the imagery. This is known as the post-mission linear correction model.

Figure 12:
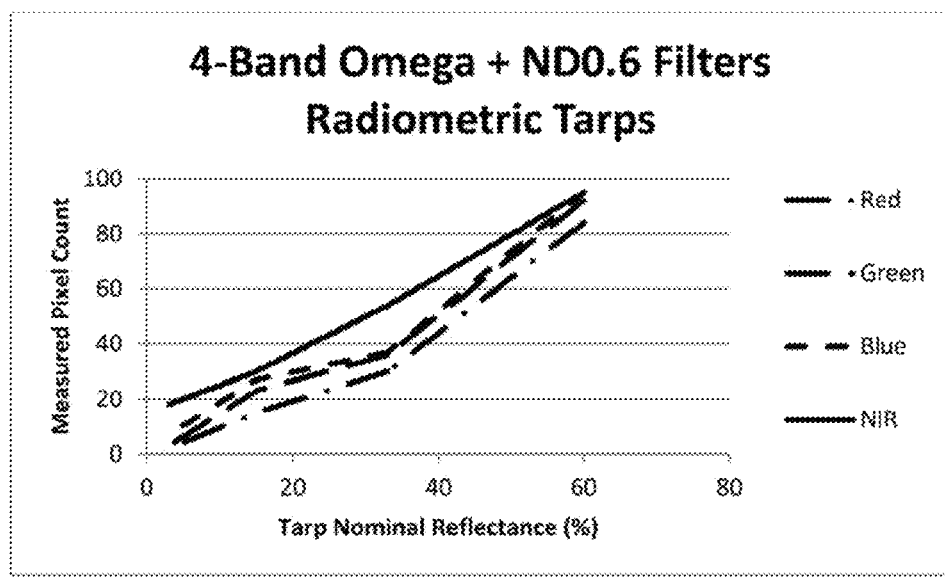
FIG. 12 is a graph comparing reflectance values of the four commercially available radiometric tarps, computed according to an embodiment of the present invention, with the published reflectance values.

A calibrated camera 60 as is described herein has been used in flight to take pictures of tarps on the ground having shades and published reflectance values as shown in FIG. 11. Reflectance values were computed according to the above methodology and plotted in FIG. 12 against the published reflectances.

According to a further embodiment of the present invention, additional or alternate calibration techniques may be employed. The camera 60 may be calibrated using a Macbeth® ColorChecker2 radiometric target 90 along with standard Kodak White (90% reflectance) and Gray (18% reflectance) targets plus Edmund Optic black flock paper (<3% reflectance). The targets 90 may be imaged under either direct sunlight or a laboratory illumination source. The non-Macbeth® targets are used to measure the spectral power distribution across the Macbeth® target and to verify the linearity of the calibration. By doing the calibration with a visible external filter or the 4-band external filter, the calibration software computes the appropriate color correction matrix. In addition to the color correction matrix, the pre-gain and post-gain model parameters are also computed.

Figure 13:
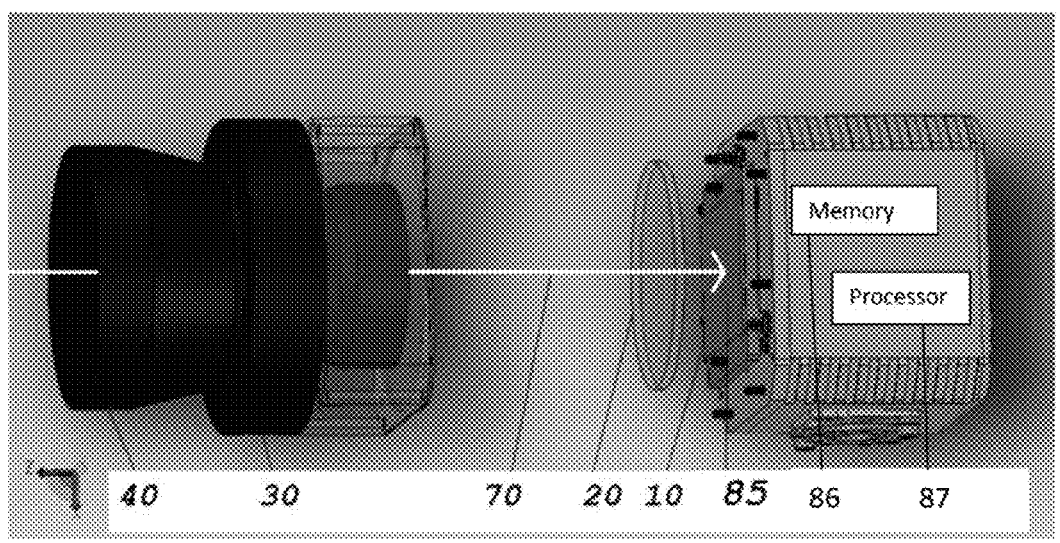
FIG. 13 is a partial cutaway image of portions of a camera 60 according to an embodiment of the invention, showing an optical filter 20 positioned over a single CCD 10.

FIG. 13 shows a cutaway image of portions of a camera 60 according to an embodiment of the invention. The CCD 10 is shown, with the location of cover glass 85 being on this CCD 10. This cover glass 85 is not considered to be "protective glass" as the term is used herein. The special optical filter 20 appears in front of the CCD and in front of the CCD's cover glass 85, in an area normally associated with protective glass. A mechanical shutter 30 is also shown. Lenses and the ND filter 40 are towards the very front of the camera 60. The optical path 70 incident on the CCD 10 is shown. The camera 60 may contain memory 88 and one or more processor(s) 87.

Figure 14:
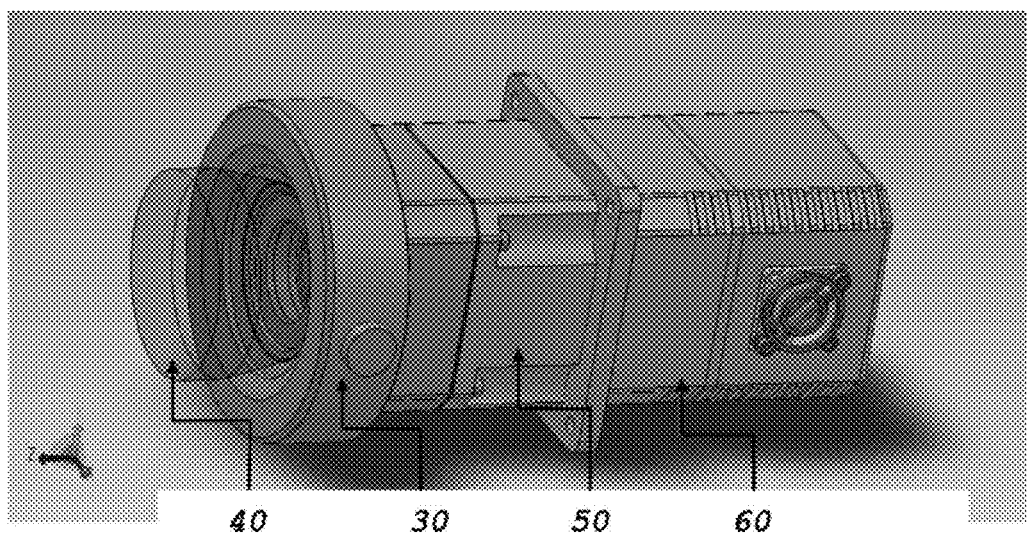
FIG. 14 is an exterior image of a camera 60 according to an embodiment of the invention.

FIG. 14 is an external view, showing several of the components of the camera 60 according to an embodiment of the invention, such as various lenses and the ND filter 40, the mechanical shutter 30, and a spacer 50.

Figure 15:
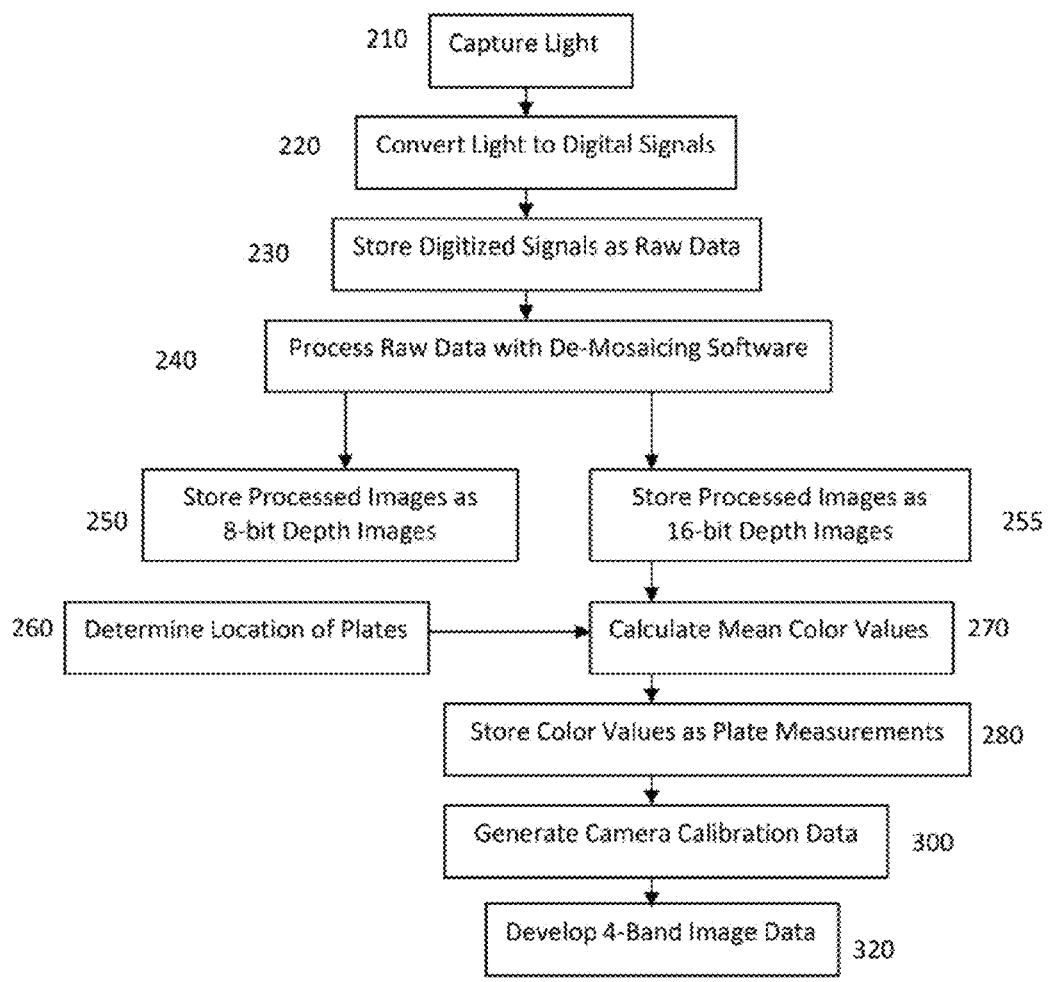
FIG. 15 is a flow chart for the generation of 4-band data using imagery captured with a camera 60.

A method according to the present invention can be explained with reference to the flow chart of FIG. 15. At step 210, the camera 60 captures (such as through a visible or a ND filter 40 and the special optical filter 20) the light incident on the CCD 10, which may correspond, for example, to an image of the color target 90 or of a scene for which 4-band image data is desired by a user. At step 220, this light is converted by the CCD into digital signals which are, at step 230, stored as raw data on a storage device. At step 240, de-mosaicing software (for example, such de-mosaicing software as is made available by Truesense) is used to process the raw data into images. These images are stored, at step 250, as 8-bit depth images. These images are also stored, at step 255, as 16-bit depth images. Preferably, the 8-bit depth images and 16-bit depth images are at the full resolution obtainable through the CCD 10.

At step 260, locations 152 of the plates (91; 92) within the image of the color target 90 (such as a Macbeth® color target) are determined. At step 270, using the 16-bit file and the locations 152, mean (that is, average) color values within each location/region 152 are calculated. Preferably, values are determined for the red, green, blue and pan pixels in each plate's location 152. At step 280, these values are stored as plate measurements. At step 300, these plate measurements, along with truth values (also known as truth information) pertaining to the color target 90 are used to generate camera calibration data. At step 320, 4-band image data is developed using this camera calibration data and using a 16-bit image file corresponding to a scene for which 4-band image data is desired by a user.

With modification, the devices and methods disclosed herein (particularly in connection with FIGS. 13-15) may be used in generating a 3×3 color correction matrix instead of a 4×4 color correction matrix. For example, to be used in generating a 3×3 color correction matrix, the camera 60, as shown in FIGS. 13-14 may be modified by replacing the ND filter 40 with a visible filter. As explained above, in connection with step 210 of FIG. 15, the light is captured through a visible filter instead of a ND filter 40. This is preferable when generating a 3×3 color correction matrix. In using the method of FIG. 15 to generate a 3×3 color correction matrix, it will be noted that the captured scene is one where 3-band image data is desired by a user. At step 270, values are preferably determined only for red, green and blue pixels in each plate's location 152. At step 320, 3-band image data (rather than 4-band image data) is developed using camera calibration data, and may be stored, such as in memory 86.

In one embodiment of the present invention, there is a camera for capturing an image of an object in an optical path emanating from the object, having a CCD for capturing the image, the CCD disposed at a distant end of the optical path and having at least four different pixel responses to light emitted from the object, an optical filter for removing energy of a portion of the spectrum of wavelengths between red and NIR, the optical filter disposed in the optical path between the object and the CCD, and a ND filter for attenuating light, the ND filter disposed in the optical path between the object and the CCD. In this embodiment, the ND filter allows a first proportion of light transmission in a visible wavelength region, and allows a second proportion of light transmission in a NIR wavelength region, the first proportion of light transmission being lower than the second proportion of light transmission. The at least four different pixel responses may be exactly four different pixel responses. These exactly four different pixel responses may be pan, red plus NIR, green plus NIR, and blue plus NIR light.

In further embodiments, the portion of the spectrum of wavelengths extends between 650 nm and 800 nm or between 700 nm and 800 nm.

In another embodiment, the optical filter removes only the portion of the spectrum of wavelengths that is between red and NIR.

In yet another embodiment, the optical filter is located in a place normally associated with protective glass for the CCD. The CCD may have no protective glass other than the optical filter.

In additional embodiments, the first proportion of light transmission is 24% and the second proportion of light transmission is 88%, or the first proportion of light transmission is 20-30% and the second proportion of light transmission is 82-94%, or the ratio of the first proportion of light transmission to the second proportion of light transmission is between 1:3 and 1:4, or the ratio of the first proportion of light transmission to the second proportion of light transmission is between 1:3.5 and 1:4.0.

In one more embodiment, the ND filter is a Tiffen ND0.6 filter.

In a further embodiment, the CCD is a TrueSense CFA CCD.

In a yet further embodiment, the CCD is a TrueSense Class 1 KAI-29050 CCD.

In an additional embodiment, a mechanical shutter is disposed in the optical path between the object and the CCD.

In yet one more additional embodiment, the CCD having at least four different pixel responses to light emitted from the object is the only CCD. The camera may output 4-band image data. The 4-band image data may include red, green, blue and NIR data.

In another embodiment, the visible wavelength region extends between 400 nm and 650 nm.

In yet another embodiment, the NIR wavelength region extends between 800 nm and 1100 nm.

According to one embodiment, there is a method for generating 4-band image data which involves obtaining four spectral channels of data using a single CCD, and generating, based on the four spectral channels of data and based on a 4×4 color correction matrix, 4-band image data having red, green, blue and NIR data. The four spectral channels of data may correspond to red plus NIR, green plus NIR, blue plus NIR and pan light.

In a further embodiment, the step of obtaining four spectral channels of data further involves using an optical filter which removes a wavelength region that is between red and NIR. The step of obtaining four spectral channels of data may further involve using a ND filter that allows a first proportion of light transmission in a wavelength region between 400 nm and 650 nm, and that allows a second proportion of light transmission in a wavelength region between 800 nm and 1100 nm, in which the first proportion of light transmission is lower than the second proportion of light transmission. The step of obtaining four spectral channels of data may further involve using a mechanical shutter. This step may further involve using a short exposure time under high ambient light conditions.

In an additional embodiment, the step of generating, based on the four spectral channels of data and based on a 4×4 color correction matrix, 4-band image data having red, green, blue and NIR data involves applying the 4×4 color correction matrix to full resolution values of each pixel of each spectral channel of data to generate red, green, blue and NIR estimates for the pixel.

In yet another additional embodiment, comprising color balancing may be performed for at least some of the four spectral channels of data. This color balancing may involve color balancing the spectral channel corresponding to red light and color balancing the spectral channel corresponding to blue light. This color balancing may further involve not color balancing the spectral channel corresponding to green light and not color balancing the spectral channel corresponding to pan light.

In a further embodiment, the color balancing occurs after obtaining four spectral channels of data using a single CCD.

In yet one more embodiment, 4-band image data is compared against truth information from a color target and a linear optimal model is generated for each band of the 4-band image data.

In one embodiment, there is a method for generating a 4×4 color correction matrix involving obtaining four spectral channels of data by imaging a color target with a single CCD; and generating a 4×4 color correction matrix based on the four spectral channels of data. the four spectral channels of data may include red plus NIR, green plus NIR, blue plus NIR and pan channels.

In a further embodiment, the step of obtaining four spectral channels of data further involves using an optical filter which removes a wavelength region that is between red and NIR. The step of obtaining four spectral channels of data may further involve using a ND filter that allows a first proportion of light transmission in a wavelength region between 400 nm and 650 nm, and that allows a second proportion of light transmission in a wavelength region between 800 nm and 1100 nm, in which the first proportion of light transmission is lower than the second proportion of light transmission.

In yet a further embodiment, the color target is a Macbeth® ColorChecker 2 calibration target.

In further embodiments, the imaging a color target occurs in sunlight, or using a mask pattern. The mask pattern may have mosaiced red, green, blue and pan pixels. The method may involve de-mosaicing the four spectral channels of data and deriving a value of each pixel in each of the four spectral channels by interpolating nearby pixels. The 4×4 color correction matrix may include red, green, blue and pan data. The 4×4 color correction matrix may be at a resolution equal to the maximum resolution obtainable by the single CCD.

In one more embodiment, generating the 4×4 color correction matrix further involves generating a 3-band image of the color target based on the imaging a color target, and determining a region corresponding to each plate of the color target. It may also involve computing average values for red, green, blue and pan pixels in the region corresponding to each plate of the color target, and comparing the average values to truth data for each plate of the color target. It may involve storing the region corresponding to each plate of the color target, generating an image based on the region corresponding to each plate of the color target, and verifying that the region corresponding to each plate of the color target has been correctly assigned based on the image. It may involve computing average values for red, green, blue and pan pixels in the region corresponding to each plate of the color target.

In a further embodiment, the step of generating a 4×4 color correction matrix based on the four spectral channels of data further involves performing a linear regression on the average values, in which the four spectral channels of data comprise red plus NIR, green plus NIR, blue plus NIR, and pan channels.

In one embodiment, there is a method for generating a 3×3 color correction matrix, involving obtaining three spectral channels of data by imaging a color target with a single CCD, using a VIS filter that removes NIR light, in which the three spectral channels of data comprise red plus NIR, green plus NIR, and blue plus NIR channels, and generating a 3×3 color correction matrix based on the three spectral channels of data. A 3-band image of the color target may be generated based on the imaging a color target, and a region may be determined corresponding to each plate of the color target. Average values may be computed for red, green and blue pixels in the region corresponding to each plate of the color target, and the average values may be compared to truth data for each plate of the color target.

In a further embodiment, the method for generating a 3×3 color correction matrix further involves storing the region corresponding to each plate of the color target, generating an image based on the region corresponding to each plate of the color target, and verifying that the region corresponding to each plate of the color target has been correctly assigned based on the image.

In yet another further embodiment, the step of generating a 3×3 color correction matrix based on the three spectral channels of data further involves performing a linear regression on the average values.

The embodiments herein are illustrative only. It will be understood that various changes and modifications may be effected by one skilled in the art without departing from the spirit and scope of the invention. For example, it will be understood that the various filters disclosed herein may be replaced with other filters having similar optical properties.

What is claimed is:

1. A camera for capturing an image of an object in an optical path emanating from the object, comprising:
   a CCD for capturing the image, the CCD disposed at a distant end of the optical path and having at least four different pixel responses to light emitted from the object;
   an optical filter for removing energy of a portion of the spectrum of wavelengths between red and NIR, the optical filter disposed in the optical path between the object and the CCD; and
   a ND filter for attenuating light, the ND filter disposed in the optical path between the object and the CCD;
   wherein the ND filter allows a first percentage of light in a visible wavelength region incident on the ND filter to be transmitted through the ND filter, and allows a second percentage of light in a NIR wavelength region incident on the ND filter to be transmitted through the ND filter, the first percentage being lower than the second percentage,
   wherein the first percentage is 20-30% and the second percentage is 82-94%.

2. The camera of claim 1, wherein the at least four different pixel responses comprise exactly four different pixel responses.

3. The camera of claim 2, wherein the exactly four different pixel responses are pan plus NIR, red plus NIR, green plus NIR, and blue plus NIR light.

4. The camera of claim 1 wherein the portion of the spectrum of wavelengths extends between 650 nm and 800 nm.

5. The camera of claim 1, wherein the portion of the spectrum of wavelengths extends between 700 nm and 800 nm.

6. The camera of claim 1, wherein the optical filter removes only the portion of the spectrum of wavelengths that is between red and NIR.

7. The camera of claim 1, wherein:
   the optical filter is located in a mounting location for a protective glass for the CCD.

8. The camera of claim 7, wherein the CCD has no protective glass other than the optical filter.

9. The camera of claim 1, wherein the first percentage is 24% and the second percentage is 88%.

10. The camera of claim 1, wherein the ratio of the first percentage to the second percentage is between 1:3 and 1:4.

11. The camera of claim 1, wherein the ratio of the first percentage to the second percentage is between 1:3.5 and 1:4.0.

12. The camera of claim 1, wherein the ND filter is a Tiffen ND0.6 filter.

13. The camera of claim 1, wherein the CCD is a TrueSense CFA CCD.

14. The camera of claim 1, wherein the CCD is a TrueSense Class 1 KAI-29050 CCD.

15. The camera of claim 1, further comprising a mechanical shutter disposed in the optical path between h object and the CCD.

16. The camera of claim 1, wherein the camera comprises exactly one CCD.

17. The camera of claim 16, wherein the camera outputs 4-band image data.

18. The camera of claim 17, wherein the 4-band image data comprises red, green, blue and NIR data.

19. The camera of claim 1, wherein the visible wavelength region extends between 400 nm and 650 nm.

20. The camera of claim 1, wherein the NIR wavelength region extends between 899 nm and 1100 nm.

21. A method for generating 4-band image data comprising:
   obtaining four spectral channels of data using a single CCD and using an optical filter which removes a wavelength region that is between red and NIR; and
   generating based on the four spectral channels of data and based on a 4×4 color correction matrix, 4-band image data comprising red, green, blue and NIR data,
   wherein the step of obtaining four spectral channels of data further comprising using a ND filter that allows a first percentage of light in a wavelength region between 400 nm and 650 nm incident on the ND filter to be transmitted through the ND filter, and that allows a second percentage of light in a wavelength region between 800 nm and 1100 nm incident on the ND filter to be transmitted through the ND filter, wherein the first percentage is lower than the second percentage,
   wherein the first percentage is 20-30% and the second percentage is 82-94%.

22. The method of claim 21, wherein the step of obtaining four spectral channels of data further comprises using a mechanical shutter.

23. The method of claim 22, wherein the step of obtaining four spectral channels of data further comprises using a short exposure time under high ambient light conditions.

24. A method for generating a 4×4 color correction matrix comprising:
   obtaining four spectral channels of data by imaging a color target with a single CCD and using an optical filter which removes a wavelength region that is between red and NIR; and
   generating a 4×4 color correction matrix based on the four spectral channels of data, wherein the step of obtaining four spectral channels of data further comprising using a ND filter that allows a first percentage of light in a wavelength region between 400 nm and 650 nm incident on the ND filter to be transmitted through the ND filter, and that allows a second percentage of light in a wavelength region between 800 nm and 1100 nm incident on the ND filter to be transmitted through the ND filter, wherein the first percentage is lower than the second percentage,
   wherein the first percentage is 20-30% and the second percentage is 82-94%.

25. The method of claim 24, wherein the color target is a Macbeth® ColorChecker 2 calibration target.

26. The method of claim 24, wherein the imaging the color target occurs in sunlight.

27. The method of claim 24, wherein the imaging the color target occurs using a mask pattern.

28. The method of claim 27, wherein the mask pattern has mosaiced red, green, blue and pan pixels.

29. The method of claim 28, further comprising demosaicing the four spectral channels of data and deriving a value of each pixel in each of the four spectral channels by interpolating nearby pixels.

30. The method of claim 28, wherein the 4×4 color correction matrix comprises red, green, blue and pan data.

31. The method of claim 30, wherein the 4×4 color correction matrix is at a resolution equal to the maximum resolution obtainable by the single CCD.

\* \* \* \* \*